C. W. MOTT.
POWER OPERATED PLOW.
APPLICATION FILED NOV. 6, 1916.

1,394,930.

Patented Oct. 25, 1921.
3 SHEETS—SHEET 1.

Inventor.
Carl W. Mott.
By Chas. E. Lord
Atty.

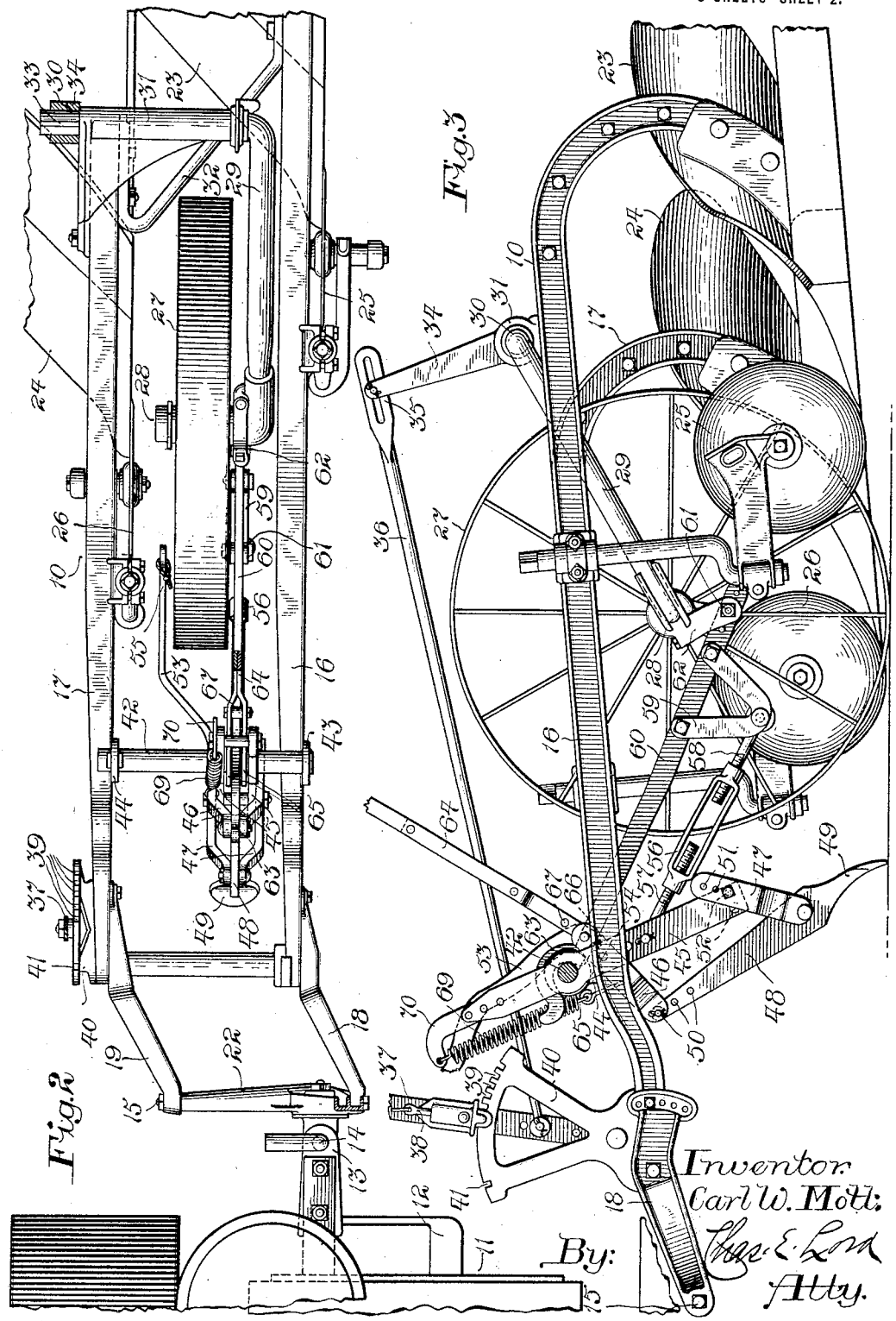

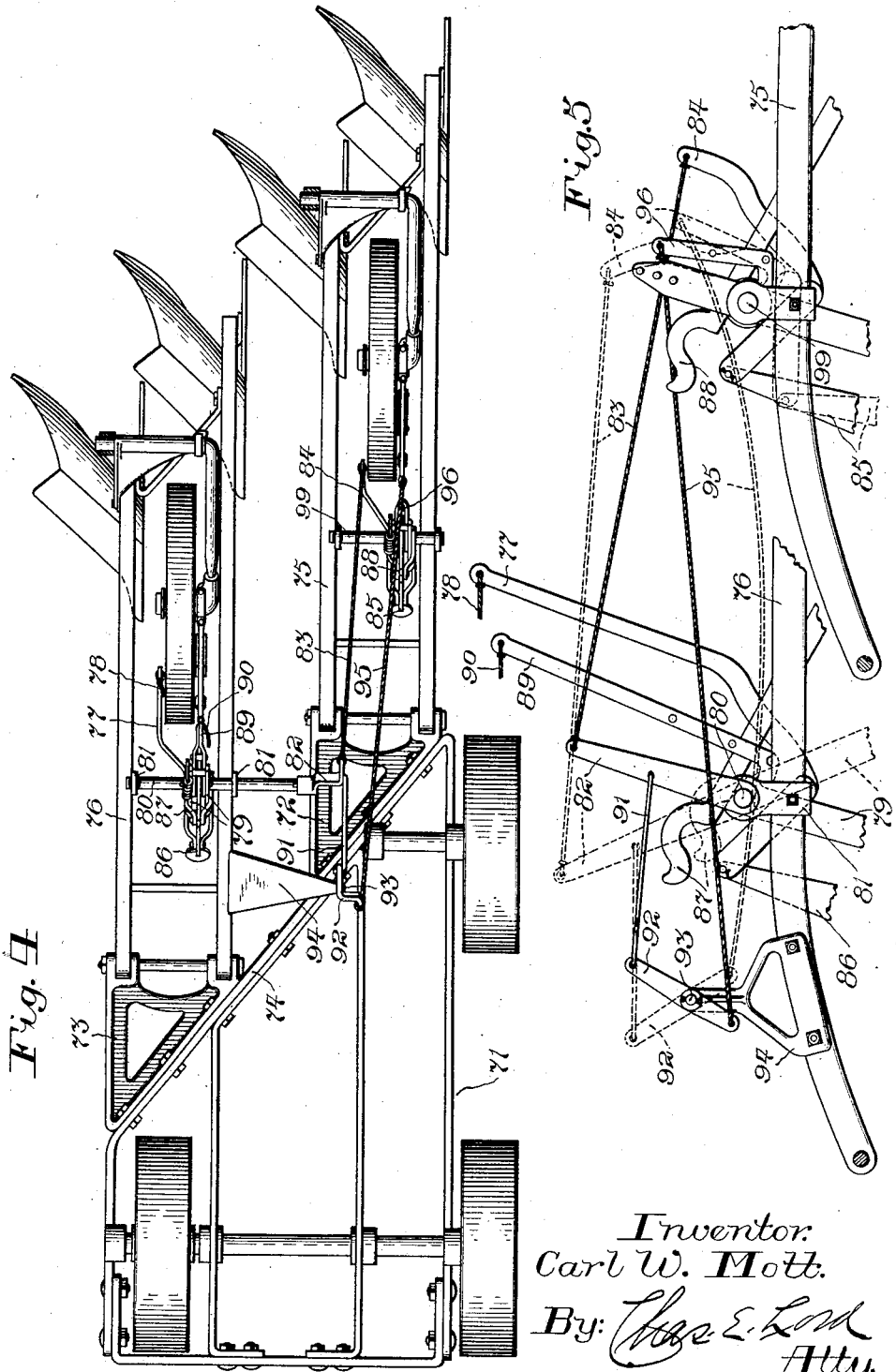

UNITED STATES PATENT OFFICE.

CARL W. MOTT, OF CHICAGO, ILLINOIS, ASSIGNOR, BY MESNE ASSIGNMENTS, TO INTERNATIONAL HARVESTER COMPANY, A CORPORATION OF NEW JERSEY.

POWER-OPERATED PLOW.

1,394,930.    Specification of Letters Patent.    Patented Oct. 25, 1921.

Application filed November 6, 1916. Serial No. 129,810.

*To all whom it may concern:*

Be it known that I, CARL W. MOTT, a citizen of the United States, residing at Chicago, in the county of Cook and State of Illinois, have invented certain new and useful Improvements in Power-Operated Plows, of which the following is a full, clear, and exact specification.

This invention relates to power operated plows and to control means therefor.

One of the objects of this invention is to improve the method of raising plows by power.

Another object is to improve the control of power lift plows.

Another object is to provide a simple, durable, inexpensive and efficient arrangement whereby plows may be raised by power and controlled in their movements in a manner to meet all of the requirements for successful commercial operation.

These and other objects are accomplished by providing, in combination, a plow, means including a ground engaging member whereby the plow is raised, and control means for said member.

The invention is illustrated on the accompanying sheets of drawings, in which—

Fig. 2 is a top plan view of the same;

Fig. 3 is a side elevation of the same arrangement disclosed in Fig. 1 with the plow shares raised out of the ground and held in such position;

Fig. 4 is a top plan view showing my invention applied to a plurality of independently operated plow units; and Fig. 5 is a fragmentary detail side elevation of the control means employed in connection with the arrangement disclosed in Fig. 4.

Figure 1:
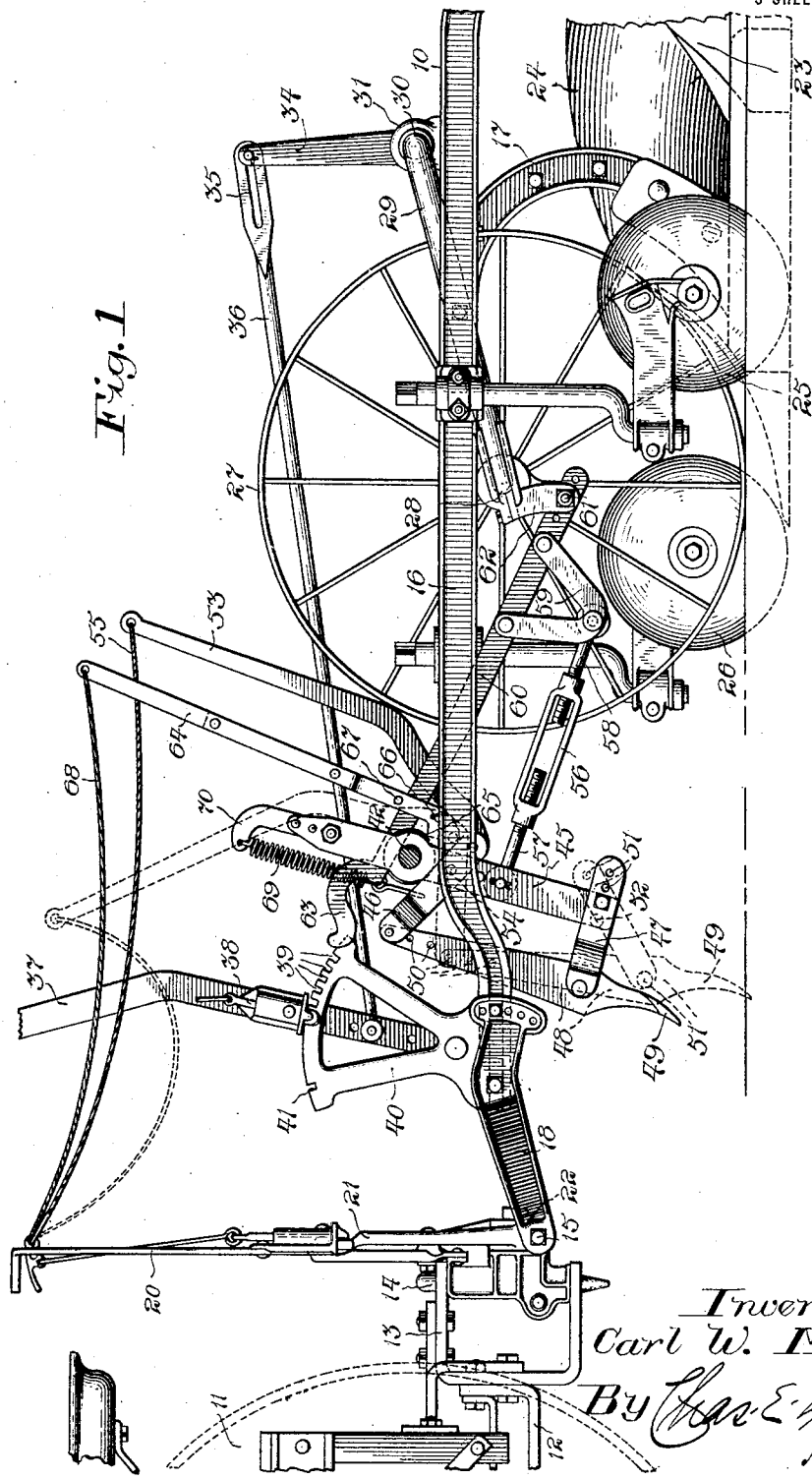
Figure 1 is a fragmentary side elevation of a gang of two plows embodying my invention, the plows being shown as hitched to the rear end of a tractor, the plow shares being within the ground.

The various novel features of the invention will be apparent from the following description and drawings and will be particularly pointed out in the appended claims.

I am well aware of the fact that in the plow art various arrangements have been provided whereby a single plow may be raised, or a series of plows raised in succession by power derived from a traction wheel of the plow frame or traction wheel of a tractor which draws the plows. I make no claim to such arrangements. These arrangements which have just been referred to; namely, the old arrangements, have been successful to a certain degree, but I wish to emphasize at this point that the power for raising the plows in what I choose to call the old way, is dependent upon the effective friction between the ground and the traction wheel from which the power is transmitted. In other words, if muddy conditions prevail, or if plows are operating in sandy soil, or for any other reason, there is a slippage between the wheel, from which the power is derived, and the ground, the raising of the plows will be delayed, hindered or prevented. The action will be anything but positive. These are some of the disadvantages and objectionable features which I have overcome by means of my invention.

To illustrate one embodiment of my invention, reference being had particularly to Figs. 1, 2 and 3, a gang 10 of two plows connected to a propelling tractor 11 is shown. Extending rearwardly from the frame 12 of the tractor is a universal draft connection 13 including a vertical pivot 14 and horizontal pivot 15, to the latter of which the longitudinally extending frame members 16 and 17 of the gang 10 are pivotally connected through their offset forwardly extending arms 18 and 19, respectively. The relative positions of the frame members 16 and 17 as to height may be adjusted by a suitable pivotally mounted lever 20 having a detent which coöperates with a segment 21 formed integral with a sleeve member 22 extending between the front portions of the arms 18 and 19.

The rear ends of the gang frame members 16 and 17 are curved downwardly and carry, respectively, plow bodies 23 and 24, the usual colter wheels 25 and 26 being provided and secured to the frame members in the usual manner. Located between the gang frame members 16 and 17 is a carrying wheel 27 which is rotatably mounted upon a laterally extending portion 28 of a crank 29 which has another laterally extending portion 30 which is journaled in a bracket 31 secured to the side frame member 17 and a brace 32 extending between the side frame members 16 and 17. Secured to the laterally extending portion 30 of the crank 29 by a key 33 is an arm 34, the upper end of which is connected to a slotted portion 35 of a link 36 connected to a hand control lever 37 for controlling the depth to which the plows may sink into the ground. This control lever 37 has a detent 38 adapted to engage any one of a series of notches 39 in a segment 40, by means of which the lever may be locked in any one of several positions. This segment also has another notch 41 into which the detent 38 may pass when the lever 37 has been operated manually to raise the plows out of the ground. It is apparent from the above that the depth to which the plows may sink into the ground is controlled by the position to which the carrying wheel 27 may be adjusted through the actuation of the hand control lever 37.

Referring more particularly to the means by which the plow bodies may be raised out of the ground by power as distinguished from manual operation, I have shown toward the front of the gang a cross rod 42 supported in suitable bracket members 43 and 44 secured to the gang frame members 16 and 17, respectively. Pivotally mounted upon this cross rod 42 is one member 45 of a lift operating device comprising compound lever mechanism including links 46 and 47 and a ground engaging member 48 having a sharpened end or spud 49 which is adapted to coöperate directly with the ground in raising the plows therefrom. The ground engaging member 48 has a plurality of apertures 50, by means of which it may be adjustably connected with the link 46 to change the normal position of the member 48 with respect to the ground to advance or delay its effective action when operated. In a similar manner the link 47 is provided with a series of apertures 51 and the lower end of the member 45 with a plurality of apertures 52, by means of which the forward and backward position of the ground engaging member 48 may be adjusted. The link 46 includes two side members, one of which takes the form of a control lever 53 for directly controlling the action of the ground engaging or spud member 48. This link 46 is pivoted to the member 45 at 54. It is seen, therefore, that when the operator pulls forwardly on the rope or cable 55, which is connected to the upper end of the control lever 53, the sharp end of the ground engaging member or spud will be thrust into engagement with the ground. The point of the spud will temporarily remain fixed as the main body portion, or more particularly, the gang frame members 16 and 17 and their plows continue to move in a forward direction. It is this relative forward movement of the frame and plows while the ground engaging member remains stationary, so far as forward advance is concerned, which is effective in raising the plows out of the ground. The raising power is transmitted by a connection including a turn buckle 56, one of its coöperating threaded members 57 of which is pivotally connected to the lazy tongs member 45, and the coöperating threaded member 58 of which is pivotally connected to a bracket 59, which in turn is connected to a bar 60 pivotally connected at 61 to a bracket 62 secured to the lower end of crank 29 upon which the carrying or depth regulating wheel 27 is supported. By means of this connection it is seen that when the ground engaging member is thrust downwardly and into engagement with the ground, as shown in dotted lines in Fig. 1, the plow frame and its plows continue to advance and that the point of the spud or ground engaging member remains substantially stationary, so far as forward advance is concerned, and that the lower portion of the member 45 will be swung relatively rearwardly, thereby forcing the turn buckle connection relatively rearwardly, thereby holding the carrying wheel 27 substantially stationary, causing the plows to move gradually forward out of the ground about the laterally extending axle portion 28 of the crank 29 as a center. As the plow frame advances forwardly with respect to its carrying wheel 27, it is to be noted that the hooked end 63 of the bar 60 passes rearwardly with respect to the cross rod 42, and at the time that the plow bodies have been completely raised out of and sufficiently clear of the ground, the hooked portion 63 passes into a position to receive the cross rod 42, thereby positively locking the plows in their raised position. Of course, it is understood that the cable 55 may be released as soon as the spud takes a positive position with respect to the ground.

The plows will remain locked in this raised or elevated position until released by the operator. The releasing mechanism includes a control lever 64, one end of which is bifurcated and provided with loops 65 which are pivotally mounted on and embrace the cross rod 42. Extending through the bifurcated portion of the releasing control lever 64 are two studs 66 and 67. It is seen that if the cable 68, which is connected to the lever 64, is drawn forwardly in a manner to draw the lever forwardly, the lower one of the studs 66 will pass into engagement with the under side of the bar 60 to raise the hooked portion 63 of the bar 60 out of engagement with the cross rod 42, whereupon the plows are free to sink in the ground. As the plows lower, the bar 60 will move forwardly to carry the hooked portion 63 beyond the cross bar 42. At the same time the turn buckle connection will be moved forwardly to force the lazy tongs member 45 back into its normal position, as shown in Fig. 1. Of course, it will be understood that the ground engaging or spud member 48 is snapped out of engagement with the ground by the action of the spring 69 when the lever 53 is released and provided the raising action of the plows is completed. One end of the spring 69 is operatively connected to the link 46, and the opposite end is connected to a bracket 70 adjustably connected to the upper end of the lazy tongs member 45. It is to be noted, however, that the spring does not return the ground engaging member 48 into its normal position out of engagement with the ground until the control lever 53 is released.

By means of this arrangement, therefore, it is seen that the plows may be raised out of the ground by drawing the control lever 53 forwardly in a manner to cause the spud member 48 to engage with the ground, the plows and frame then being raised out of the ground about the laterally extending portion 28 of crank axle 29 as a pivot. It is seen, furthermore, that when the plows have been completely raised out of the ground, they are automatically locked in such raised position by the hooked portion 63 of rod 60 passing over and receiving the cross rod 42. At this point it is to be noted, particular reference being had to Fig. 3, that the hooked portion 63 is positively held in a locked position by the action of the force transmitted from the lazy tongs member 45 through the turn buckle 56, which is directed below the center of the pivotal point of the bar 60 with the bracket 62. This arrangement causes the positive locking of the hooked portion 63 over the cross bar 42, thereby maintaining a positive locking action of the plows in raised position. It is seen, furthermore, that the plows are permitted to lower when the release control lever 64 is drawn forwardly and, as stated above, the spring 69 is effective in returning the spud from engagement with the ground. The stud 67 in the bifurcated portion of the release control lever 64 normally rests on top of the bar 60 to support the lever. By means of the various adjustable connections referred to, the operating mechanism is rendered rangy to a considerable degree.

In Figs. 1, 2 and 3 my invention has been disclosed in connection with a single unit of two plows which are positively fixed to the same frame, and thereby raised and lowered simultaneously. In Figs. 4 and 5 I have shown my invention as applied to a plurality of plow units which are adapted to be raised and lowered in a predetermined succession.

Referring first to Fig. 4, I have provided a frame 71 which may be either the frame of a tractor or a frame which may be connected to the rear end of a tractor. This frame is provided with a plurality of brackets 72 and 73 secured to the rear diagonal frame member 74. Pivotally mounted to these brackets are two plow units 75 and 76, each unit including two plows. They might include one plow, or even three plows, if so desired. For the sake of simplicity, I shall refer to the members 75 and 76 as plow units. With the arrangement shown in Figs. 4 and 5, if it is desired to raise the plow units with their plows, it is merely necessary to draw the control lever 77 forwardly through the agency of a suitable cable 78, whereupon the ground engaging member will be thrust into the ground to perform its regular function, as hereinabove described. In performing this function, the lower end of the member 79 is moved rearwardly from its full line to its dotted line position. In view of the fact that this member 79, in this instance, is keyed to the cross rod 80, which is pivotally mounted in suitable brackets 81 of the unit 76, this cross bar is caused to rock in a counterclockwise direction, as viewed in Fig. 5. In a like manner an arm 82 secured to one end of the rod 80 is rocked forwardly from its full line position, as shown in Fig. 5, causing the cable 83 to draw the upper end of control lever 84 forwardly for forcing the ground engaging member 85 of the second plow unit 75 into engagement with the ground, whereupon the second unit is raised. That is to say, when the control lever 77 is moved forwardly, the ground engaging members 86 and 85 of the gang units 76 and 75, respectively, are successively thrown into engagement with the ground to successively raise the gang units 76 and 75. As in the arrangement shown in Figs. 1, 2 and 3, these plow units are locked in raised position by hooked members 87 and 88 engaging their respective cross rods 80 and 99. To release the plows from their raised position to permit them to lower in succession, a control lever 89 is provided which is moved forwardly by a cable 90. The front gang unit is released in exactly the same way as described and shown in connection with Figs. 1, 2 and 3. However, it is to be noted that when the front unit 76 is released, the member 82 moves from its dotted line position to its full line position, as shown in Fig. 5, whereupon the hooked member 88 on the second gang unit 75 is released to permit the second plow unit to lower through a connection, including a link 91 connected at one end to the member 82 and at the other end to a suitably supported lever 92 pivoted at 93 on a bracket 94, the other end of said lever being connected to one end of a cable 95, the other end of which is connected to the release control lever 96 on the second plow unit 75. It is seen, therefore, that the plow units 76 and 75 are successively released by drawing the release control lever 89 forwardly. By means of the arrangement shown in Figs. 4 and 5, if it is desired to raise the plow units successively, the same may be accomplished by merely drawing the control lever 77 forwardly until the front spud 86 is passed into engagement with the ground, whereupon the plows will be raised automatically and will be locked in their raised position through the agency of the members 87 and 88, it being understood that the control lever 77 may be released as soon as the front spud 86 has engaged the ground. When it is desired to release the plow units, the same may be accomplished by drawing the release control lever 89 forwardly, whereupon, through the connections hereinabove described, the plow units 76 and 75 will be successively released to permit the plows to sink into the ground.

By means of the arrangement herein disclosed and described, the plows may be positively lifted by power, locked in raised position, and released in an efficient manner to meet all the conditions for successful commercial operation.

It is evident that there may be various modifications of the precise forms herein shown and described, and it is my intention to cover all such modifications without departing from the spirit and scope of my invention as set forth in the following claims.

What I claim as new is:

1. In combination, a frame, a ground wheel vertically adjustable with respect thereto, a lift operating device carried by the frame and adapted to be thrown into engagement with the ground during travel and means for lowering the ground wheel through the action of said device when engaged with the ground.

2. In combination, a frame, a ground wheel vertically adjustable with respect thereto, a lift operating device carried by the frame and adapted to be thrown into engagement with the ground during travel, means for lowering the ground wheel through the action of said device when engaged with the ground and means coöperating with said device for locking the wheel in lowered position.

3. In combination, a frame, a crank pivoted on the frame, a ground wheel journaled on the crank, a depending member pivoted to the frame, a connection between the crank and member and means for throwing the depending end of the member into engagement with the ground.

4. In combination, a frame, a crank pivoted on the frame, a ground wheel journaled on the crank, a depending member pivoted to the frame in advance of the wheel, a link connecting the crank and member and means for throwing the depending end of the member into engagement with the ground.

5. In combination, a frame, a crank pivoted on the frame, a ground wheel journaled on the crank, a depending member pivoted to the frame in advance of the wheel, a link connecting the crank and member, means for throwing the depending end of the member into engagement with the ground during travel whereby it is moved rearwardly and the crank and wheel swung downwardly and means connected with said link for locking the crank and wheel in lowered position.

6. In combination, a frame, a crank pivoted on the frame, a ground wheel journaled on the crank, depending lever mechanism pivoted to the frame including a main lever and a supplemental ground engaging lever connected to the main lever for longitudinal movement vertically thereof, means for moving the supplemental lever downwardly into engagement with the ground and a link connection between the main lever and crank.

7. In combination, a frame, a crank pivoted on the frame, a ground wheel journaled on the crank, depending lever mechanism pivoted to the frame including a main lever and a supplemental lever connected to the main lever for longitudinal movement vertically thereof, a spring normally retaining the supplemental lever in elevated position, means for lowering it into engagement with the ground against the tension of the spring and a link connection between the main lever and crank.

8. In combination, a frame, a plow beam pivoted thereto and carrying a plow, a crank axle pivotally mounted on the beam, a ground wheel on the crank axle, lift operating means connected to said crank axle and supported on the beam and which is adapted to be thrust into the ground to raise said beam with respect to said ground wheel, and means for locking the beam in a raised position.

9. In combination, a frame, a plow beam pivoted thereto carrying a plow, a crank axle pivotally mounted on the beam, a ground wheel on the crank axle, means connected to said crank axle to raise said beam with respect to said ground wheel, said means including a bar adapted to be thrust into the ground, links connecting said bar to the beam and to the crank axle, and means for locking the beam in a raised position.

10. In combination, a frame, a plow beam pivoted thereto and carrying a plow, a crank axle pivotally mounted on the beam, a ground wheel on the crank axle, means connected to said crank axle to raise said beam with respect to said ground wheel, said means including a bar adapted to be thrust into the ground, links connecting said bar to the frame and to the crank axle, means for locking the beam in a raised position, and means for releasing said locking means while the plow is in motion.

11. In combination, a frame, a plow beam pivoted thereto and carrying a plow, a crank axle pivotally mounted on the beam, a ground wheel on the crank axle, means connected to said crank axle and which is adapted to be thrust into the ground, the ground engaging point remaining relatively stationary with respect to the ground while the plow is being raised to raise said beam with respect to said ground wheel, and means for locking the beam in a raised position.

12. In combination, a plow beam, a crank hingedly mounted thereon extending downwardly and forwardly, a ground wheel carried by the crank, and ground engaging means independently hinged to the bottom and connected to the ground wheel for raising the plow beam.

13. In combination, a plow beam, a crank hingedly mounted thereon extending downwardly and forwardly, a ground wheel carried by the crank, and ground actuated means independently hinged to the beam and connected to the ground wheel for raising the plow beam by retarding the forward movement of the ground wheel and a tripping device for throwing said means into action.

14. In combination, a plurality of successive plow units, traction actuated lift mechanism on each unit, separate trip levers on each unit for controlling the lifting and lowering action of the lift respectively, and means connected with the lift mechanism of a forward unit and with the trip levers of a succeeding unit for actuating the corresponding trip lever of the succeeding unit when the lift mechanism of the forward unit is operating to either lift or lower the said unit.

15. In combination, a plurality of successive plow units, traction actuated lift mechanisms on each unit, separate trip levers on each unit for controlling the lifting and lowering action of the lift respectively, manually controlled devices for the levers on the first unit, an auxiliary lever connected to the lift mechanism on the forward unit, separate connections between said auxiliary lever and each of the trip levers on the succeeding unit through which a swing of the auxiliary lever in one direction actuates the raising means and the swing of said lever in the opposite direction actuates the lowering means of the next succeeding unit.

In testimony whereof I affix my signature.

CARL W. MOTT.